United States Patent Office 3,769,252
Patented Oct. 30, 1973

3,769,252
PROCESS FOR PREPARING A FLUOROCARBON POLYMER ANHYDROUS ORGANOSOL
Tuneo Fujii, Suita, and Seisuke Suzue, Takatsuki, Japan, assignors to Daikin Kogyo Co., Ltd.
No Drawing. Filed July 23, 1971, Ser. No. 165,746
Claims priority, application Japan, July 25, 1970, 45/65,341, 45/65,342, 45/65,343
Int. Cl. C08f 45/28, 45/34, 47/28
U.S. Cl. 260—32.8 R                    9 Claims

ABSTRACT OF THE DISCLOSURE

A process for preparing a stable, substantially anhydrous organosol of fluorocarbon polymer which comprises admixing an aqueous dispersion of tetrafluoroethylene polymer having a particle size of 0.05 to 0.5 micron, an average particle size of 0.1 to 0.3 micron and a standard specific gravity of 2.20 to 2.30 and/or aqueous dispersion of tetrafluoroethylene-hexafluoropropylene copolymer having a particle size of 0.01 to 0.3 micron, an average particle size of 0.05 to 0.2 micron, a specific melt viscosity at 380° C. of $1 \times 10^3$ to $10^6$ poises and a ratio by weight of tetrafluoroethylene:hexafluoropropylene of 97/3 to 5/95 with an organic solvent which is insoluble or hardly soluble in water and does not interfere chemically or physically with the said polymer as a transferring solvent and an organic solvent which is soluble in water or an aqueous solution of an electrolyte as a transferring agent so as to transfer the polymer particles from the water layer into the transferring solvent layer and separating the transferring solvent layer from the said water layer.

The present invention relates to a process for preparing a fluorocarbon polymer composition. In one aspect of the invention, it is concerned with a stable, substantially anhydrous organosol comprising tetrafluoroethylene polymer (hereinafter referred to as "PTFE") and/or tetrafluoroethylene-hexafluoropropylene copolymer (hereinafter referred to as "FEP") dispersed in an organic solvent. In another aspect of the invention, it is concerned with a composition for coating which comprises the said organosol and a film-forming material.

For preparation of an organosol of a fluorocarbon polymer, there have been proposed a variety of methods, of which some examples are as follows: a method comprising heating an aqueous dispersion of PTFE with an organic solvent soluble in water (e.g. alcohol, ether, amine), if necessary, under reduced pressure so as to evaporate water [U.S. Pat. No. 2,937,156]: a method comprising heating an aqueous dispersion of PTFE with formamide and an anionic or nonionic surface active agent under reduced pressure, if necessary, in the presence of an organic solvent soluble in water (e.g. alcohol, ether, amine) [British Pat. No. 1,094,349]; a method comprising admixing an aqueous dispersion of PTFE with an organic solvent (e.g. hydrocarbon, ketone, ether) containing a specific high polymer of straight carbon chain and adding thereto an aqueous solution of an electrolyte or an organic solvent (e.g. acetone) so as to coagulate PTFE particles and transfer the resultant coagulation from the water layer into the organic layer [British Pat. No. 696,321]; and a method comprising admixing an aqueous dispersion of FEP with an organic solvent which gives an azeotropic mixture with water and heating the resultant mixture so as to remove azeotropically water therefrom [British Pat. No. 1,064,840].

However, some drawbacks are seen in these known methods, and a satisfactory organosol has never been provided. For instance, by U.S. Pat. No. 2,937,156, the resultant PTFE organosol contains 3 to 20% by weight of water, which is not favorable for incorporation of additives such as a film-forming agent therein. By British Pat. No. 1,094,349, a substantially anhydrous organosol of PTFE can be obtained, but it contains 3 to 25% by weight of a surface active agent. When the organosol is used for making a film on a substance at a baking temperature of 330 to 400° C., the surface active agent remaining in the organosol in such a large amount is decomposed and scattered so that, on the obtained film, cracks, bubbles and the like are seen. On the other hand, when the organosol is used for coating on admixture with any other polymer at a lower baking temperature, the surface active agent remains in the obtained film and deteriorates the quality of the film. Besides, in the preparation and storage of the organosol, many troubles are accompanied, because undesirable coagulation of polymer particles are readily caused by heat or mechanical stimulation. By British Pat. No. 696,321, in spite of the presence of a specific high polymer of straight carbon chain incorporated for prevention of coagulation of PTFE, the polymer particles are coagulated and minimization of the coagulation is impossible. On admixture with any other polymer, uniform dispersion thereof in the organosol is quite difficult, and so the organosol can be used only for limited purposes. Besides, a large amount of water is contained in the organosol so that incorporation of an organic solution of a film-forming material therein is difficult. In addition, the presence of the specific high polymer of straight carbon chain has a bad influence on the quality and the appearance of the film to be formed from the organosol. By British Pat. No. 1,064,840, the aqueous dispersion of a fluorocarbon polymer must be dropwise added into the boiling organic solvent which gives an azeotropic mixture with water, because coagulation of the polymer particles or bumping of the organic solvent is caused by abrupt addition of the aqueous dispersion in large quantities. Further, for sufficient elimination of water, azeotropic distillation must be executed for a long duration. Therefore, previous concentration of the aqueous dispersion is necessitated so as to shorten the distillation time, which causes some disadvantages, e.g. incorporation of additives such as a surface active agent, complication of the preparation processes, and the like.

As the result of studies, it has been found that a stable, substantially anhydrous organosol of a fluorocarbon polymer can be readily obtained by admixing an aqueous dispersion of the fluorocarbon polymer with a specific transferring solvent and a specific transferring agent.

According to the present invention, a stable, substantially anhydrous organosol of a fluorocarbon polymer can be prepared by admixing an aqueous dispersion of PTFE having a particle size of 0.05 to 0.5 micron, an average particle size of 0.1 to 0.3 micron and a standard specific gravity of 2.20 to 2.30 and/or an aqueous dispersion of FEP having a particle size of 0.01 to 0.3 micron, an average particle size of 0.05 to 0.2 micron, a specific melt viscosity at 380° C. of $1 \times 10^3$ to $10^6$ poises and a ratio by weight of tetrafluoroethylene:hexafluoropropylene of 97/3 to 5/95 with an organic solvent which is insoluble or hardly soluble in water and does not interfere chemically or physically with the polymer as a transferring solvent and an organic solvent which is soluble in water or an aqueous solution of an electrolyte as a transferring agent, while stirring so as to transfer the polymer particles from the water layer into the transferring solvent layer and removing off the said water layer.

The PTFE particles in the said aqueous dispersion of PTFE are spheres having a particle size of about 0.05 to 0.5 micron, an average particle size of about 0.1 to 0.3 micron and a standard specific gravity of about 2.20 to 2.30. They can be produced by the method as described in U.S. Pat. No. 2,559,752 or U.S. Pat. No. 2,750,350. The aqueous dispersion of such PTFE is, however, presently available on the market.

The term "standard specific gravity" used hereinabove indicates the degree of polymerization of PTFE and may be determined as follows:

The PTFE powder (5 g.) obtained by coagulation of an aqueous dispersion of PTFE is molded in a cylinder of 30 mm. in diameter under a pressure of 300 kg./cm.$^2$. The obtained disc of 30 mm. in diameter and 3 mm. in height is baked in a bath of potassium nitrate-sodium nitrate at 360° C. for about 40 minutes. The bath temperature is lowered to 300° C. at a rate of 20° C./hour, and then the disc is allowed to cool in the atmosphere to room temperature. The resultant molded product is subjected to measurement of the specific gravity at 23° C./23° C. using n-butanol by a conventional balance method.

The FEP particles in the said aqueous dispersion of FEP are spheres having a particle size of about 0.01 to 0.3 micron, an average particle size of about 0.05 to 0.2 micron, a specific melt viscosity at 380° C. of about $1 \times 10^3$ to $10^6$ poises and a ratio by weight of tetrafluoroethylene:hexafluoropropylene of 97/3 to 5/95, preferably 90/10 to 50/50 (particularly 90/10 to 80/20). They can be readily produced by the method described in U.S. Pat. No. 2,946,763. The aqueous dispersion of such FEP is, however, presently available on the market.

The said "specific melt viscosity" is the value by poise which is determined using a melt indexer as described in ASTM D1238–52T as follows:

The FEP polymer is filled in a cylinder of 9.5 mm. in inner diameter retained at 380±5° C. and, after allowing it to stand for 5 minutes, it receives a load of 5,000 g. whereby it is extruded through a nozzle of 0.21 mm. in inner diameter and 8 mm. in length. 53,150 is divided by the extrusion rate (g./min.) to give the objective value.

In the preparation of the organosol of the invention, when a mixture of the aqueous dispersion of PTFE and the aqueous dispersion of FEP is used, the proportion of the two kinds of aqueous dispersions is varied with the standard specific gravity of PTFE. For instance, when the standard specific gravity of PTFE is 2.20 to 2.25, the ratio of PTFE:FEP by weight percent is 60/40 or less, preferably 45/55 or less (especially 40–5/60–95). Further for instance, when the standard specific gravity of PTFE is 2.28, the ratio of PTFE:FEP by weight percent is 100–5/0–95. The aqueous dispersion of a fluorocarbon polymer to be used in the present invention is required to be fluid and its concentration is 1% by weight or more, preferably 5 to 70% by weight.

The organic solvent used as a transferring solvent is insoluble or hardly soluble in water and does not interfere chemically or physically with the polymers. Specific examples thereof are hexane, heptane, octane, benzene, toluene, methylisobutylketone, carbon tetrachloride, chloroform and the like. Particularly preferred are solvents which are liquid at the reaction conditions to be employed and whose solubility to water is 4 g. per 100 g. of water or less at 20° C. The amount of the transferring solvent to be used is 0.5 to 5 times, preferably 1.0 to 2.0 times, to the weight of the fluorocarbon polymers.

The organic solvent used as a transferring agent is optionally miscible with water, liquid at room temperature and has a boiling point of 20° C. or below. Examples of such an organic solvent are acetone, methanol and the like. As the electrolyte alternatively used as a transferring agent in the form of an aqueous solution, there may be exemplified sodium sulfate, magnesium chloride, calcium chloride, sodium formate, potassium acetate and the like. The concentration of the aqueous solution is 0.01% by weight or more, preferably from 0.1 to 10% by weight. The amount of the transferring agent to be used is 0.5 or more times, preferably from 2.5 to 10 times, to the weight of the fluorocarbon polymers.

The preparation of the organosol of the invention is usually accomplished by admixing an aqueous dispersion of PTFE and/or FEP with the transferring solvent, slowly adding thereto the transferring agent while stirring so as to transfer the polymer particles from the water layer to the transferring solvent layer and collecting the resultant organosol by a conventional method such as decantation or filtration. Alternatively, an aqueous dispersion of PTFE and/or FEP may be first admixed with the transferring agent, and then the transferring solvent may be added thereto while stirring. As the case may be, the thus obtained organosol is heated with the transferring solvent or another organic solvent which does not interfere chemically or physically with the organosol, if necessary under reduced pressure, so as to remove water. During the process for the elimination of water, the organosol is required to be moistened with the organic solvent. If it is not moistened with the organic solvent, the formation of a minimized organosol becomes difficult. On the other hand, when a transferring agent as defined above is used in a conventional process for preparation of an organosol, the fluorocarbon polymer particles are coagulated and minimization of the coagulation becomes impossible. According to the present invention, such coagulation is not caused, and only a slight amount of particles may be sometimes coagulated. Even in such case, minimization is readily executed.

The thus obtained organosol is substantially anhydrous and the water content therein is less than 1.0% by weight, usually less than 0.5% by weight.

In the organosol as above prepared, the polymer particles may be sometimes partially coagulated. Therefore, it is usually preferred to minimize the polymer particles by treatment of the organosol, for instance, with a ball mill or a pebble mill of conventional type for 30 minutes to 72 hours at a temperature below 30° C., preferably below 20° C., and above the solidifying point of the organic solvent or such temperature at which the viscosity of the organic solvent is so high as to make the action of the mill ineffective. The treatment at a temperature above 30° C. may rather cause unfavorable coagulation of the polymer particles when the degree of polymerization of PTFE or the content of PTFE is high.

The organosol of the invention contains usually 5 to 60% by weight, preferably 20 to 50% by weight, of polymer with a particle size of 0.01 to 3 microns, normally 0.01 to 2 microns. When the content is more than 50% by weight, the viscosity increases so that the organosol can only be handled with difficulty and the particles therein may be secondarily coagulated on storage. The particles after storage for a long period can be readily redispersed by a simple operation such as mechanical agitation if the content is from 20 to 50% by weight. A higher stability of the organosol is generally obtained by a lower degree of polymerization of PTFE or a lower content of PTFE. The organosol of the invention can be ordinarily stored at room temperature but, when the degree of polymerization of PTFE or the content of PTFE is high, it is preferred to store it at a temperature lower than 20° C. to prevent coagulation. If necessary, the organosol of the invention may be diluted with any other appropriate organic solvent, or the organic solvent in the organosol may be replaced by any other suitable organic solvent.

The organosol of the invention is per se used for treatment of paper, cloth, metal plates and so on. For instance, the material to be treated may be sprayed with or dipped in the organosol and then dried to form a coating layer thereon. When the thus treated material is baked at 280 to 420° C., preferably at 290 to 400° C., for 5 to 100 minutes, the formation of a uniform and tough film is accomplished.

The film formed on a metal plate using a conventional organosol of a fluorocarbon polymer is peeled off with relative ease, whereas the film formed by the use of the organosol of the invention is much more firmly adhered on a metal plate and is not readily eliminated. When the content of FEP is high in a mixture of an aqueous dispersion of PTFE and an aqueous dispersion of FEP, a film with cracks is formed by a conventional method, but according to the present invention, the formation of such a film is not seen. Compared with the conventional film of FEP alone, the film of the invention is much more tough and resistant to abrasion. The coefficient of friction thereof is normally about 0.035 to 0.05 which is much lower than that of a conventional FEP film (i.e. about 0.055 to 0.075). Moreover, the film of the invention is excellent in its anti-sticking property.

Alternatively, the organosol of the invention may be incorporated with a film-forming material to afford an advantageous composition for coating. Since the organosol is quite stable and substantially anhydrous, the uniform blending of a film-forming agent therein can be accomplished with ease. Examples of the film-forming material include thermoplastic and thermosetting polymers having per se a film-forming property such as nitrocellulose, cellulose acetate butyrate, alkyd resin, polyester, polyurethane, phenol-formaldehyde resin, urea-formaldehyde resin, melamine-formaldehyde resin, epoxy resin, polychlorotrifluoroethylene, polyvinylidene fluoride, polyvinyl fluoride and the like.

Besides the thermoplastic and thermosetting polymers as above exemplified, there may be also used as a film-forming material a heat resistant polymer which does not decompose at a temperature higher than the melting point of a mixture of PTFE and FEP or its precursor. Examples of such polymer and precursor are polyimide, polyamide, polyamidoimide, polyoxadiazole, polybenzimidazole, polysiloxane, etc.

On incorporation into the organosol, the film-forming material may be used in the form of a solution or organosol. The proportion of the film-forming material and the organosol may be 5/95 to 90/10, preferably 30/70 to 70/30 by weight.

The thus obtained composition may be applied to various materials such as paper, cloth and metal plates in the same manner as illustrated above on the use of the organosol itself. On drying in the atmosphere or heating, the coating layer on the surface of the applied material is hardened to form a film of low coefficient of friction and high anti-sticking property. Compared with the organosol itself, the composition incorporated with a film-forming material is advantageous in the applicability to various materials at a much lower temperature. Thus, the composition is applicable to materials that are poorly resistant to heat and unable to receive the application of the organosol.

The film formed by the use of the composition as above obtained is advantageous in high adhesiveness, toughness, self-lubricating and anti-sticking properties. It is more abrasion-resistant than a film of PTFE alone and has a much lower coefficient of friction and a much more excellent property than those of a FEP film.

In a conventional film obtained from a fluorocarbon polymer incorporated with a film-forming material, the fluorocarbon polymer and the film-forming material are separated into the two layers, i.e. the polymer into upper layer and the film-forming material into the lower layer. Therefore, the quality of the film is gradually changed with its abrasion during use. On the contrary, the film obtained according to the present invention is freed from such a disadvantage, and excellent properties are maintained even if the film is subjected to abrasion.

Practical and presently-preferred embodiments of the present invention are illustratively shown in the following examples where parts are by weight.

In the examples, the methods for measurement of the physical properties are as follows:

Coefficient of friction.—Measurement is made by the Bowden-Leben apparatus using a steel ball of 8 mm. in diameter with a rate of 0.23 cm./sec. and a load of 1 kg.

Taber abrasion.—Weight loss is measured by using the Taber abrasion tester with abrasion wheels CS17 and 1 kg. load on each wheel after 1,000 rotations.

Wear resistance.—Weight loss is measured by using a polished rotating disc SUS–23B with a sliding rate of 2.3 m./sec. and a load of 0.57 kg./cm.$^2$ for 10 minutes.

Erichsen test.—The adhesion state of a film when the film is dented from the opposite side so as to make 10 mm. high at the center of a hemisphere is observed.

Scratch test.—Measurement is carried out by using the Toyo spiral scratch test machine with 300 g. load.

Pencil hardness.—A pencil of decided hardness, being held onto the coated surface at an angle of 45° under 1 kg. load, is moved more than 5 mm. distance to scratch the surface and the upper limit of hardness which does not afford any scratch on the surface.

Hydrophobic and oleophobic properties.—Each one drop of 0.04% aqueous solution of ammonium perfluorooctanoate and n-hexadecane is placed on the coated surface of a horizontally kept plate from an injector. The plate is inclined to an angle of 45°. By observing the trace of the aqueous solution and the paraffin, judgement is made.

EXAMPLE 1

An aqueous dispersion of PTFE (polymer content, 60% by weight; "Polyflon Dispersion D–1" manufactured by Daikin Kogyo Co., Ltd.) is diluted with distilled water. The resultant aqueous dispersion of PTFE (standard specific gravity, 2.29; polymer content, 17% by weight) (590 parts) and n-hexane (100 parts) is charged in a glass reactor, and the contents are stirred at 1,000 r.p.m. by a propeller type stirrer of 40 mm. in diameter, while acetone (200 parts) is dropwise added thereto. After the addition of acetone is completed, stirring is stopped, whereby the mixture is separated into two layers, and PEFE particles are precipitated into the lower organic layer. The precipitates are collected by filtration to give a greasy organosol (200 parts) containing PTFE particles in a high concentration. The obtained organosol is admixed with methylisobutylketone (180 parts), and the mixture is heated in a water bath to remove water. The resultant greasy material is further admixed with methylisobutylketone (100 parts) to give an organosol containing 30% by weight of PTFE particles. The water content determined by the Karl-Fischer method is 0.045% by weight.

EXAMPLE 2

In a polyethylene reactor, an aqueous dispersion of PTFE (standard specific gravity, 2.28; polymer content, 58% by weight) (175 parts) and methylisobutylketone (100 parts) are charged. The contents are stirred at 1,400 r.p.m. by a propeller type stirrer of 40 mm. in diameter, while 0.5% aqueous solution of potassium chloride (200 parts) is added dropwise thereto. After the addition is completed, the resultant precipitates are collected by filtration to give a greasy organosol (195 parts) containing 48% of PTFE particles.

EXAMPLE 3

In a glass reactor, an aqueous dispersion of FEP (polymer content, 50% by weight; "Neoflon Dispersion ND–1"

manufactured by Daikin Kogyo Co., Ltd.) (200 parts) and n-hexane (120 parts) are charged. The contents are stirred at 1,100 r.p.m. by a propeller type stirrer of 40 mm. in diameter, and acetone (250 parts) is added dropwise thereto, during which FEP particles pass into the organic solvent. After the addition is completed, stirring is stopped whereby the mixture is separated into two layers, and FEP particles are precipitated into the lower organic layer. The precipitates are collected by filtration to give a greasy organosol (210 parts) containing 47.0% by weight of FEP particles. The water content determined by the Karl-Fischer method is 0.82% by weight. The obtained organosol is admixed with methylisobutylketone (180 parts), and the mixture is heated in a water bath to remove water. The resultant paste is further admixed with methylisobutylketone (100 parts) to give an organosol (350 parts) containing 28.5% by weight of FEP particles. The water content determined by the Karl-Fischer method is 0.05% by weight.

EXAMPLES 4–8

FEP organosols are prepared as in Example 3 with variations in the concentration and the amount of the aqueous dispersion of FEP and the kinds of the transferring solvent and the transferring agent. The results are shown in Table 1.

to give an organosol (350 parts) containing 28.5% of PTFE and FEP particles (1:9 by weight). The water content determined by the Karl-Fischer method is 0.05% by weight.

EXAMPLES 10–12

Organosols are prepared as in Example 9 with variations in the kind of the aqueous dispersion of PTFE, the ratio of PTFE and FEP and the kinds of the transferring solvent and the transferring agent. The results are shown in Table 2.

TABLE 2

| Example number | PTFE standard specific gravity | PTFE/FEP ratio by weight | Parts | | | Organosol | | Remarks |
|---|---|---|---|---|---|---|---|---|
| | | | Amount of polymers | Transferring solvent | Transferring agent | Amount (parts) | Particle content, percent | |
| 10 | 2.27 | 80/20 | 100 | n-Heptane (100) | Acetone (200) | | | Partly coagulated in organosol. |
| 11 | 2.27 | 60/40 | 100 | Toluene (100) | Acetone (500) | 205 | 47.5 | Uniformly dispersed and extemely stable. |
| 12 | 2.29 | 30/70 | 100 | n-Hexane (100) | 1% aqueous sodium formate (200). | 205 | 48 | Do. |

EXAMPLE 13

In a glass reactor, a mixture of an aqueous dispersion of PTFE (polymer content, 60% by weight) (50 parts) and an aqueous dispersion of FEP (polymer content, 50% by weight) (120 parts) and n-heptane (120 parts) are charged. The contents are stirred at 1,000 r.p.m. by a propeller type stirrer of 40 mm. in diameter, while acetone (300 parts) is dropwise added thereto. After the addition is completed, stirring is stopped, whereby the mixture is separated into two layers, and PTFE and FEP particles are precipitated into the lower organic layer. The precipitates are collected by filtration, and the obtained greasy organosol (210 parts) is admixed with methylisobutylketone (80 parts) and stirred to give an organosol

TABLE 1

| Example number | Polymer content in aqueous dispersion of FEP, percent | Amount of aqueous dispersion of FEP | Parts | | Methylisobutylketone | Organosol | | Remarks |
|---|---|---|---|---|---|---|---|---|
| | | | Transferring solvent | Transferring agent | | Amount (parts) | Particle content, percent | |
| 4 | 50 | 200 | Methylisobutylketone (100) | 1% aqueous sodium formate (200). | 80 | 270 | 36 | Extremely stable. |
| 5 | 20 | 400 | Carbon tetrachloride (100) | Acetone (200) | 80 | 255 | 31 | Do. |
| 6 | 20 | 200 | n-Heptane (80) | 0.1% aqueous KCl (200) | 80 | 195 | 20 | Do. |
| 7 | 50 | 200 | Toluene (100) | Methanol (200) | | | | Stable. |
| 8 | 50 | 200 | n-Butanol (100) | Acetone (200) | | | | No separation in the layers. |

EXAMPLE 9

In a glass reactor, a mixture of an aqueous dispersion of PTFE (polymer content, 60% by weight) (16.5 parts) and an aqueous dispersion of FEP (polymer content, 50% by weight) (180 parts) and n-hexane (120 parts) are charged. The contents are stirred at 1,100 r.p.m. by a propeller type stirrer of 40 mm. in diameter, and acetone (250 parts) is dropwise added thereto, during which PTFE and FEP particles pass into the organic solvent. After the addition is completed, stirring is stopped whereby the mixture is separated into two layers, and PTFE and FEP particles are precipitated into the lower organic layer. The precipitates are collected by filtration to give a greasy organosol (210 parts) containing 47.0% by weight of PTFE and FEP particles. The water content determined by the Karl-Fischer method is 0.82% by weight. The obtained organosol is admixed with methylisobutylketone (180 parts), and the mixture is heated in a water bath to remove water. The resultant paste is further admixed with methylisobutylketone (100 parts)

containing 34.5% by weight of PTFE and FEP particles. The water content determined by the Karl-Fischer method is 0.5% by weight.

EXAMPLE 14

In a polyethylene reactor, a mixture of an aqueous dispersion of PTFE (polymer content, 30% by weight) (100 parts) and an aqueous dispersion of FEP (polymer content, 30% by weight) (233 parts) and carbon tetrachloride (120 parts) is charged. Acetone (200 parts) are dropwise added thereto while stirring, whereby PTFE and FEP particles pass into the organic layer. The resultant precipitates are collected by filtration, and the obtained greasy organosol (210 parts) is admixed with methylisobutylketone (80 parts) to give an organosol containing 24% by weight of PTFE and FEP particles.

EXAMPLES 15–21

Organosols are prepared as in Example 14 with variations in the ratio of PTFE and FEP and the kinds of the transferring solvent and the transferring agent. The results are shown in Table 3.

and an aqueous dispersion of FEP (polymer content, 50% by weight) (140 parts) and n-heptane (120 parts)

TABLE 3

| Example No. | PTFE/FEP ratio by weight | Amount of polymer dispersion (concentration, 30%) | Parts | | Organosol | | | Remarks |
|---|---|---|---|---|---|---|---|---|
| | | | Transferring solvent | Transferring agent | Methylisobutylketone | Amount (parts) | Particle content, percent | |
| 15 | 20/80 | 333 | n-Heptane (100) | 5% aqueous MgCl₂ (75) | 80 | 280 | 35.5 | Extremely stable. |
| 16 | 20/80 | 333 | n-Heptane (50) | do | | | | Do. |
| 17 | 20/80 | 333 | n-Heptane (200) | do | | | | Do. |
| 18 | 20/80 | 333 | n-Heptane (100) | Methanol (200) | | 190 | 45 | Stable. |
| 19 | 20/80 | 333 | Cyclohexanol (100) | Acetone (250) | | | | No separation in the layer. |
| 20 | 20/80 | 333 | n-Butanol (100) | do | | | | Do. |
| 21 | 50/50 | 333 | n-Heptane (100) | do | | | | Partly coagulated. |

EXAMPLE 22

In a polyethylene reactor, n-hexane (100 parts) and acetone (200 parts) are charged, and a mixture of an aqueous dispersion of PTFE (polymer content, 30% by weight) (100 parts) and an aqueous dispersion of FEP (polymer content, 30% by weight) (233 parts) is dropwise added thereto while stirring. After the addition is completed, stirring is stopped, whereby the mixture is separated into two layers, and PTFE and FEP particles are precipitated into the lower organic layer. The precipitates are collected by filtration, and the obtained greasy organosol is admixed with methylisobutylketone (180 parts). The mixture is heated in a water bath to remove water. The resultant paste is admixed with methylisobutylketone (100 parts) to give an organosol (350 parts) containing 28.8% by weight of PTFE and FEP particles. The water content determined by the Karl-Fischer method is 0.06% by weight. The organosol is minimized in a ball mill at 20° C. for 5 hours into a powder of 150 mesh or less.

EXAMPLE 23

In a glass reactor, a mixture of an aqueous dispersion of PTFE (polymer content, 60% by weight) (133 parts) and an aqueous dispersion of FEP (polymer content, 50% by weight) (160 parts) and n-hexane (120 parts) are charged. The contents are stirred at 1,100 r.p.m. by a propeller type stirrer of 40 mm. in diameter, and acetone (250 parts) is dropwise added thereto, during which PTFE and FEP particles pass into the organic solvent. After the addition is completed, stirring is stopped whereby the mixture is separated into two layers, and PTFE and FEP particles are precipitated into the lower organic layer. The precipitates are collected by filtration to give a greasy organosol (210 parts) containing 47.0% by weight of PTFE and FEP particles. The water content determined by the Karl-Fischer method is 0.82% by weight. The organosol is admixed with methylisobutylketone (180 parts), and the mixture is heated in a water bath to remove water. The resultant paste is admixed with methylisobutylketone (100 parts) to give an organosol (350 parts) containing 28.5% by weight of PTFE and FEP particles. The water content determined by the Karl-Fischer method is 0.05%.

EXAMPLE 24

In a glass reactor, a mixture of an aqueous dispersion of PTFE (polymer content, 60% by weight) (50 parts) are charged. The contents are stirred at 1,000 r.p.m. by a propeller type stirrer of 40 mm. in diameter, and acetone (300 parts) is dropwise added thereto. After the addition is completed, stirring is stopped whereby the mixture is separated into two layers, and PTFE and FEP particles are precipitated into the lower organic layer. The precipitates are collected by filtration, and the obtained greasy organosol (210 parts) is admixed with methylisobutylketone (80 parts) and stirred to give an organosol containing 34.5% of PTFE and FEP particles. The water content determined by the Karl-Fischer method is 0.5% by weight.

EXAMPLE 25

In a ball mill, there are charged an organosol (PTFE content, 28.5% by weight) (220 parts) prepared as in Example 1, polyamidoimide resin (solid material content, 27% by weight; "HI-600" manufactured by Hitachi Chemical Co., Ltd.) (328 parts), N-methylpyrrolidone (200 parts), chromium oxide (24 parts) and titanium oxide (24 parts), and the mixture is kneaded well at 20° C. for 48 hours. The contents are filtered through a 150 mesh screen. The resultant composition is sprayed on a sand-blasted aluminum plate to form a film, which is dried in an infrared dryer for 30 minutes and baked at 280° C. for 30 minutes. The physical properties of the film are shown in Table 4.

EXAMPLE 26

In a ball mill, there are charged an organosol (PTFE content, 28.5% by weight) (400 parts) prepared as in Example 1, epoxy resin (solid material content, 50% by weight; "Araldite 985E" manufactured by Ciba Ltd.) (258 parts), a hardener ("Hardner HZ-985E") (86 parts), n-butyl Carbitol (69 parts), titanium oxide (6 parts) and chromium oxide (23 parts), and the mixture is kneaded well at 20° C. for 48 hours. The contents are filtered through a 150 mesh screen. The resultant composition is sprayed on a sand-blasted aluminum plate to form a film, which is dried in an infrared dryer for 30 minutes and baked at 180° C. for 30 minutes. The physical properties of the film are shown in Table 4.

TABLE 4

| Example number | Film thickness (micron) | Coefficient of friction | Taber abrasion (mg.) | Wear resistance (mg./cm.²) | Scratch test | Pencil hardness | Erichsen test | Oil and water repellency |
|---|---|---|---|---|---|---|---|---|
| 25 | 35 | 0.050 | 16 | 0.1 | Excellent | 3H | Excellent | Excellent. |
| 26 | 50 | 0.055 | 25 | 0.3 | do | 3H | do | Good. |

EXAMPLE 27

In a ball mill, there are charged the organosol (220 parts) obtained in Example 23, polyamidoimide resin (solid material content, 27% by weight; "HI-600" manufactured by Hitachi Chemical Co., Ltd.) (328 parts), N-methylpyrrolidone (200 parts), chromium oxide (24 parts) and titanium oxide (24 parts), and the mixture is kneaded well at 20° C. for 48 hours. The contents are filtered through a 150 mesh screen. The resultant composition is sprayed on a sand-blasted aluminum plate to form a film, which is dried in an infrared dryer for 30 minutes and baked at 280° C. for 30 minutes. The physical properties of the film are shown in Table 5.

EXAMPLE 28

In a ball mill, there are charged the organosol (330 parts) obtained in Example 24, epoxy resin (solid material content, 50% by weight; "Araldite 985E" manufactured by Ciba Ltd.) (258 parts), a hardener ("Hardner HZ–985") (86 parts), n-butyl Carbitol (69 parts), titanium oxide (6 parts) and chromium oxide (23 parts), and the mixture is kneaded well at 20° C. for 48 hours. The contents are filtered through a 150 mesh screen. The resultant composition is sprayed on a sand-blasted aluminum plate to form a film, which is dried in an infrared dryer for 30 minutes and baked at 180° C. for 30 minutes. The physical properties of the film are shown in Table 5.

average particle size of 0.1 to 0.3 micron and a standard specific gravity of 2.20 to 2.30 and/or an aqueous dispersion of tetrafluoroethylene-hexafluoropropylene copolymer having a particle size of 0.01 to 0.3 micron, an average particle size of 0.05 to 0.2 micron, a specific melt viscosity at 380° C. of $1 \times 10^3$ to $10^6$ poise and a ratio by weight of tetrafluoroethylene:hexafluoropropylene of 97/3 to 5/95 with an organic solvent which is insoluble or hardly soluble in water and does not interfere chemically or physically with the said polymer as a transferring solvent and an organic solvent which is soluble in water as a transferring agent so as to transfer the polymer particles from the water layer into the transferring solvent layer, and separating the transferring solvent layer from the said water layer.

2. The process according to claim 1, followed by incorporating a film-forming material into the separated transferring solvent layer.

3. The process according to claim 1, wherein the transferring solvent is a liquid under the conditions of use which has a solubility of not more than 4 g. per 100 g. of water at 20° C.

TABLE 5

| | Before abrasion | | | | | | | After abrasion | | |
|---|---|---|---|---|---|---|---|---|---|---|
| Example number | Film thickness, micron | Coefficient of friction | Taber abrasion (mg.) | Wear resistance (mg./cm.²) | Scratch test | Pencil hardness | Erichsen test | Oil and water repellency | Film thickness, micron | Coefficient of friction | Oil and water repellency |
| 27 | 35 | 0.035 | 16 | 0.1 | Excellent | 3H | Excellent | Excellent | 20 | 0.035 | Good |
| 28 | 50 | 0.040 | 25 | 0.3 | do | 3H | do | Good | 20 | 0.040 | Do. |

EXAMPLE 29

Organosols are prepared as in Example 9 with variations in the ratio of PTFE and FEP. Each organosol (polymer content, 25% by weight) (360 parts), polyamidoimide resin (solid material content, 27% by weight; "HI–600" manufactured by Hitachi Chemical Co., Ltd.) (328 parts), N-methylpyrrolidone (200 parts), chromium oxide (24 parts) and titanium oxide (4 parts) are charged in a ball mill and kneaded well at 20° C. for 48 hours. The contents are filtered through a 150 mesh screen. The resultant composition is sprayed on a sand-blasted aluminum plate to form a film, which is dried in an infrared dryer for 30 minutes and baked at 280° C. for 30 minutes. The physical properties of the film are shown in Table 6(A).

In the same manner as above but using a sole mixture of a PTFE organosol and a FEP organosol in place of the PTFE-FEP organosol, there is prepared a composition, which is coated on a sand-blasted aluminum plate by spraying to make a film thereon. The physical properties of the film after drying and baking are shown in Table 6(B).

4. A process for preparing a stable, substantially anhydrous organosol of fluorocarbon polymer which comprises admixing an aqueous dispersion of tetrafluoroethylene polymer having a particle size of 0.05 to 0.5 micron, an average particle size of 0.1 to 0.3 micron and a standard specific gravity of 2.20 to 2.30 and/or an aqueous dispersion of tetrafluoroethylene-hexafluoropropylene copolymer having a particle size of 0.01 to 0.3 micron, an average particle size of 0.05 to 0.2 micron, a specific melt viscosity at 380° C. of $1 \times 10^3$ to $10^6$ poise and a ratio by weight of tetrafluoroethylene:hexafluoropropylene of 97/3 to 5/95 with an organic solvent which is insoluble or hardly soluble in water and does not interfere chemically or physically with the said polymer as a transferring solvent and an aqueous solution of an electrolyte as a transferring agent so as to transfer the polymer particles from the water layer into the transferring solvent layer, and separating the transferring solvent layer from the said water layer.

5. The process according to claim 1, wherein said transferring solvent is selected from the group consisting of

TABLE 6

| | (A) | | | | | | | (B) | | | | |
|---|---|---|---|---|---|---|---|---|---|---|---|---|
| | Before abrasion | | | After abrasion | | | Before abrasion | | | After abrasion | | |
| PTFE/FEP ratio by weight | Film thickness, micron | Coefficient of friction | Oil and water repellency | Film thickness, micron | Coefficient of friction | Oil and water repellency | Film thickness, micron | Coefficient of friction | Oil and water repellency | Film thickness, micron | Coefficient of friction | Oil and water repellency |
| 0/100 | 45 | 0.05–0.06 | Excellent | 25 | 0.10–0.15 | Poor | 43 | 0.05–0.06 | Excellent | 24 | 0.10–0.15 | Poor. |
| 10/90 | 44 | 0.040 | do | 25 | 0.04–0.06 | Fair | 43 | 0.040 | do | 25 | 0.10–0.12 | Do. |
| 20/80 | 45 | 0.040 | do | 24 | 0.045 | Good | 45 | 0.045 | do | 25 | 0.08–1.12 | Do. |
| 30/70 | 43 | 0.035 | do | 23 | 0.035 | do | 44 | 0.035 | do | 23 | 0.07–0.09 | Do. |
| 40/60 | 43 | 0.030 | do | 24 | 0.035 | do | 42 | 0.030 | do | 24 | 0.05–0.08 | Do. |
| 50/50 | 44 | 0.035 | do | 23 | 0.035 | do | 45 | 0.035 | do | 25 | 0.05–0.06 | Fair. |

What is claimed is:

1. A process for preparing a stable, substantially anhydrous organosol of fluorocarbon polymer which comprises admixing an aqueous dispersion of tetrafluoroethylene polymer having a particle size of 0.05 to 0.5 micron, an hexane, heptane, octane, benzene, toluene, methyl isobutyl ketone, carbon tetrachloride and chloroform.

6. The process according to claim 1, wherein the amount of transferring solvent employed is 0.5 to 5 times the weight of said fluorocarbon polymers.

7. The process according to claim 1, wherein said transferring agent is selected from the group consisting of acetone and methanol.

8. The process according to claim 1, wherein the amount of transferring agent employed is 0.5 to 10 times the weight of said fluorocarbon polymers.

9. The process according to claim 1, wherein said transferring agent is selected from the group consisting of sodium sulfate, magnesium chloride, calcium chloride, sodium formate and potassium acetate.

References Cited

UNITED STATES PATENTS

| | | | |
|---|---|---|---|
| 3,631,141 | 12/1972 | Fang | 260—33.4 F |
| 3,637,569 | 1/1972 | Fang | 260—32.8 R |
| 2,718,452 | 9/1955 | Lontz | 18—54 |
| 2,937,156 | 5/1960 | Berry | 260—29.6 |

FOREIGN PATENTS

| | | |
|---|---|---|
| 1,064,840 | 4/1967 | Great Britain. |
| 1,486,628 | 9/1952 | Canada. |

MORRIS LIEBMAN, Primary Examiner

K. ZAITLEN, Assistant Examiner

U.S. Cl. X.R.

260—33.4 F, 33.6 F, 33.8 F, 900, 34.2, 29.6 F